United States Patent
Kim et al.

(10) Patent No.: US 10,505,230 B2
(45) Date of Patent: Dec. 10, 2019

(54) HYBRID ELECTRODE ASSEMBLY OF STAIR-LIKE STRUCTURE

(71) Applicant: LG CHEM, LTD., Seoul (KR)

(72) Inventors: Young Hoon Kim, Daejeon (KR); Young Joon Shin, Daejeon (KR); Sungjin Kwon, Daejeon (KR); Dong-Myung Kim, Daejeon (KR); Ki Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 288 days.

(21) Appl. No.: 15/039,947

(22) PCT Filed: Nov. 4, 2014

(86) PCT No.: PCT/KR2014/010499
§ 371 (c)(1),
(2) Date: May 27, 2016

(87) PCT Pub. No.: WO2015/102221
PCT Pub. Date: Jul. 9, 2015

(65) Prior Publication Data
US 2017/0033407 A1 Feb. 2, 2017

(30) Foreign Application Priority Data

Jan. 6, 2014 (KR) ........................ 10-2014-0001373

(51) Int. Cl.
*H01M 10/0583* (2010.01)
*H01M 10/0525* (2010.01)
*H01M 10/04* (2006.01)
*H01M 10/052* (2010.01)
*H01M 10/0585* (2010.01)
*H01M 2/02* (2006.01)

(52) U.S. Cl.
CPC ... *H01M 10/0583* (2013.01); *H01M 10/0459* (2013.01); *H01M 10/052* (2013.01);
(Continued)

(58) Field of Classification Search
CPC ......... H01M 10/0436; H01M 10/0431; H01M 10/0585; H01M 2002/0205;
(Continued)

(56) References Cited

U.S. PATENT DOCUMENTS

2001/0005561 A1 6/2001 Yamada et al.
2002/0160257 A1 10/2002 Lee et al.
(Continued)

FOREIGN PATENT DOCUMENTS

CN 1363121 A 8/2002
EP 2 750 239 A1 7/2014
(Continued)

OTHER PUBLICATIONS

International Search Report, issued in PCT/KR2014/010499, dated Feb. 16, 2015.

*Primary Examiner* — Imran Akram
(74) *Attorney, Agent, or Firm* — Birch, Stewart, Kolasch & Birch, LLP (57) ABSTRACT

Disclosed herein is an electrode assembly including unit cells, each of which is constituted by an electrode plate stack configured to have a structure in which a separator is disposed between electrode plates comprising positive electrodes or negative electrodes, wherein the electrode assembly includes a combination of two or more kinds of unit cells having different sizes, the unit cells are stacked in a height direction on the basis of a plane, two or more of the unit cells located at a lower part of the electrode assembly, i.e. two or more base unit cells, are wound using a single sheet-type separation film to constitute an integrated base structure, and the others of the unit cells excluding the base unit cells, i.e. sub unit cells, are stacked in a state in which a separator is disposed between the respective sub unit cells.

25 Claims, 5 Drawing Sheets

(52) U.S. Cl.
CPC ... *H01M 10/0525* (2013.01); *H01M 10/0585* (2013.01); *H01M 2002/0205* (2013.01); *H01M 2220/30* (2013.01); *Y02T 10/7011* (2013.01)

(58) Field of Classification Search
CPC ......... H01M 10/0413; H01M 10/0463; H01M 6/46; H01M 2/18; H01M 2/0207; H01M 2/0217; H01M 6/12
See application file for complete search history.

(56) References Cited

U.S. PATENT DOCUMENTS

| | | | |
|---|---|---|---|
| 2007/0218355 A1* | 9/2007 | Ryu | H01M 10/052 429/152 |
| 2010/0279161 A1* | 11/2010 | Kang | H01M 6/46 429/94 |
| 2011/0183183 A1 | 7/2011 | Grady et al. | |
| 2013/0236768 A1 | 9/2013 | Park et al. | |
| 2013/0295436 A1 | 11/2013 | Kwon et al. | |
| 2014/0072850 A1 | 3/2014 | Kwon et al. | |
| 2014/0099525 A1 | 4/2014 | Kwon et al. | |

FOREIGN PATENT DOCUMENTS

| | | |
|---|---|---|
| EP | 2 840 638 A1 | 2/2015 |
| KR | 10-2001-0082059 A | 8/2001 |
| KR | 10-2013-0103437 A | 9/2013 |
| KR | 10-2013-0106781 A | 9/2013 |
| WO | WO 2013/141528 A1 | 9/2013 |
| WO | WO 2013/157742 A1 | 10/2013 |
| WO | WO 2013/157744 A1 | 10/2013 |
| WO | WO 2013/176533 A1 | 11/2013 |

* cited by examiner

HYBRID ELECTRODE ASSEMBLY OF STAIR-LIKE STRUCTURE

TECHNICAL FIELD

The present invention relates to a hybrid electrode assembly having a stair-like structure.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be generally classified as a cylindrical battery, a prismatic battery, or a pouch-shaped battery. Based on the type of an electrolytic solution, a lithium secondary battery may also be classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte contained in a pouch-shaped battery case, made of a laminate sheet including a resin layer and a metal layer, in a sealed state. The electrode assembly, which is mounted in the battery case, may be configured to have a jelly-roll (wound) type structure, a stacked type structure, or a combination (stacked/folded) type structure.

Figure 1:
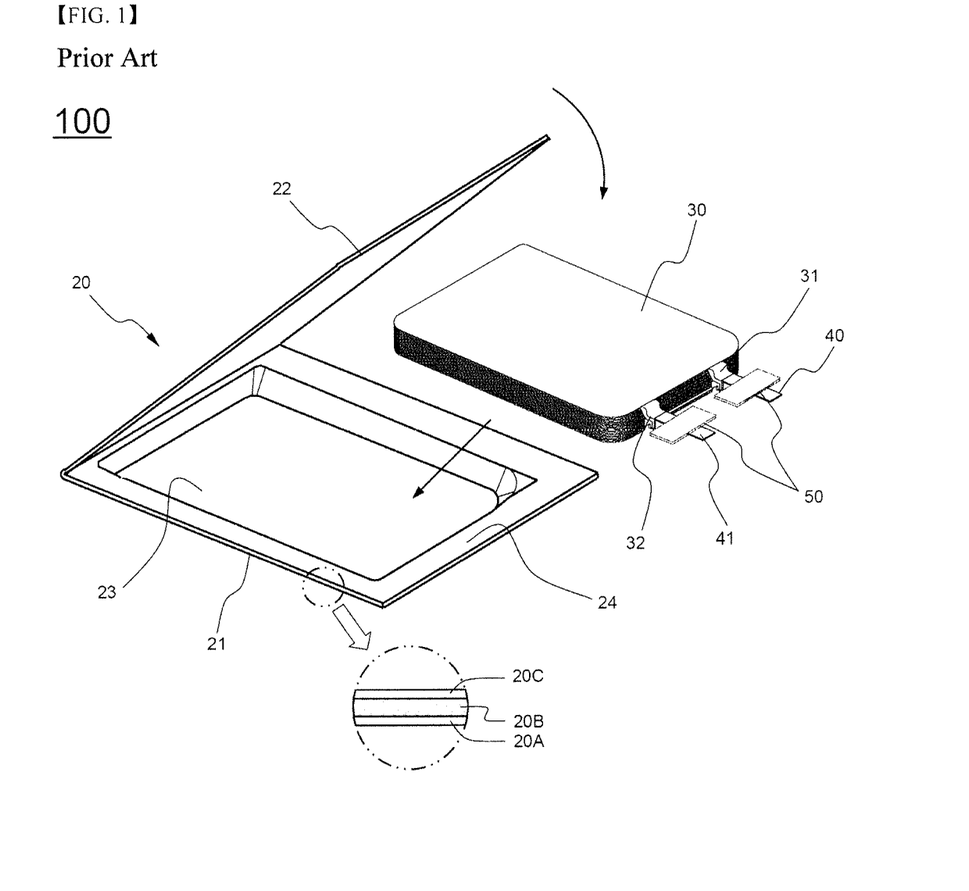
FIG. 1 is an exploded perspective view showing a general structure of a conventional battery cell.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including positive electrodes, negative electrodes, and separators disposed respectively between the positive electrodes and the negative electrodes, each of the separators being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed outward.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 are respectively coupled to the electrode leads 40 and 41 by welding. In addition, insulative films 50 may be attached to the top and bottom of each of the electrode leads 40 and 41 in order to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, new types of battery cells have been required in accordance with a trend change for a slim type design or various other designs.

That is, the above-mentioned battery cells are configured to include electrode assemblies having the same size or the same capacity. For this reason, in order to manufacture a battery cell having a novel structure designed in consideration of various possible designs of a device, to which the battery cell is applied, it is necessary to reduce the capacity of the battery cell or modify the design of the device such that the size of the device is increased.

In addition, electrical connection is complicated during modification of the design of the device, and therefore it may be difficult to manufacture a battery cell satisfying desired conditions.

Furthermore, it may also be necessary to manufacture the battery case based on the shape of the electrode assembly.

Therefore, there is a high necessity for an electrode assembly and a battery case that can be used depending upon the shape of a device, to which a battery cell is applied, and a battery cell including the same.

DISCLOSURE

Technical Problem

The present invention has been made to solve the above problems and other technical problems that have yet to be resolved.

It is an object of the present invention to provide an electrode assembly constituting a battery cell, which is configured so as to be mounted in various spaces of a device, thereby maximally utilizing the internal space of the device, and which is configured so as to be efficiently mounted in various devices having different external shapes in addition to a general device having a rectangular structure.

Technical Solution

In accordance with one aspect of the present invention, the above and other objects can be accomplished by the provision of an electrode assembly including unit cells, each of which is constituted by an electrode plate stack configured to have a structure in which a separator is disposed between electrode plates comprising positive electrodes or negative electrodes, wherein the electrode assembly includes a combination of two or more kinds of unit cells having different sizes, the unit cells are stacked in a height direction on the basis of a plane, two or more of the unit cells located at a lower part of the electrode assembly, i.e. two or more base unit cells, are wound using a single sheet-type separation film to constitute an integrated base structure, and the others of the unit cells excluding the base unit cells, i.e. sub unit cells, are stacked in a state in which a separator is disposed between the respective sub unit cells.

Consequently, the electrode assembly according to the present invention may be used to manufacture a battery cell having various capacities and sizes based on the above-described specific structure. In addition, the battery cell may be mounted in various spaces of a device, in which the battery cell is mounted, thereby maximally utilizing the internal space of the device.

Furthermore, the unit cells having different sizes are stacked in the vertical direction. Consequently, it is possible to increase the capacity of the battery cell and to improve utilization of a surplus space since the battery cell has a compact structure.

The difference in size between the unit cells is not particularly restricted. For example, the unit cells may be different from each other in terms of at least one selected from among a thickness, a breadth (horizontal length), and a width (vertical length) of each of the unit cells.

Meanwhile, as previously described, two or more of the unit cells located at a lower part of the electrode assembly, i.e. two or more base unit cells, are wound using a single sheet-type separation film to constitute an integrated base structure. Specifically, the base unit cells may be bi-cells, each of which is configured to have a structure in which one or more positive electrodes and one or more negative electrodes are stacked in a state in which a separator is disposed respectively between the positive electrodes and negative electrodes and in which the electrodes are located at opposite major surfaces of the base unit cell have the same polarity.

In addition, generally, the area of the negative electrode must be greater than that of the positive electrode in order to improve the safety of the battery cell and to prevent waste in capacity of the battery cell. For this reason, two outermost bi-cells of the integrated base structure may be C-type bi-cells, each of which is configured to have a structure in which negative electrodes are located at the opposite major surfaces of the base unit cell.

The bi-cells have the same size such that the hi-cells are wound using a single sheet-type separation film to constitute an integrated base structure, thereby securing desired rigidity.

Meanwhile, the sub unit cells may be stacked on the base unit cells, which constitute the integrated base structure, in the height direction on the basis of the plane. Specifically, each of the sub unit cells may be a full-cell, which is configured to have a structure in which the electrode plates located at opposite major surface of the sub unit cell have different polarities.

In a concrete example, the sub unit cells may have the same thickness. In addition, the sub unit cells are sequentially stacked upward from a lower end of the electrode assembly such that a sub unit cell having a smaller size is located on a sub unit cell having a larger size. As a result, the electrode assembly may be configured to have a structure in which the external shape of the electrode assembly has a stair-like step.

In this structure, the full-cells may be configured such that the electrode plates having relatively large sizes while being adjacent to each other in a state in which the separator is disposed between the electrode plates are negative electrodes.

In another concrete example, the base unit cells may have a larger thickness, breadth, and width than the sub unit cells. In addition, one of the base unit cells and a corresponding one of the full-cells adjacent to the base unit cell may be configured such that the electrode plate of the base unit cell is a negative electrode and the electrode plate of the full-cell is a positive electrode.

As previously described, generally, the area of the negative electrode must be greater than that of the positive electrode in order to improve the safety of the battery cell and to prevent waste in capacity of the battery cell, which will be described hereinafter in more detail.

A ratio of capacity to area of the positive electrode and the negative electrode at the interface between the unit cells (N/P ratio) is equal to or greater than a ratio of capacity to area of a positive electrode and a negative electrode constituting a unit cell having a relatively large area (N/P ratio).

In a case in which the N/P ratio at the interface between the unit cells is lower than the N/P ratio of the positive electrode and the negative electrode constituting the unit cell having the relatively large area, the performance and safety of the lithium secondary battery having the electrode assembly according to the present invention mounted therein may be deteriorated, which is not preferable.

A ratio of the N/P ratio of the positive electrode and the negative electrode facing each other at the interface between the unit cells to the N/P ratio of the positive electrode and the negative electrode constituting each of the unit cells may be 1:1 to 3:1, 1:1 to 2:1, or 1:1 to 1.5:1. The N/P ratio may be calculated using Equation 1 below.

$$N/P \text{ ratio} = \frac{\text{negative electrode charge capacity per unit area (mAh/cm}^2\text{)} \times \text{negative electrode efficiency (\%)}}{\text{Positive electrode design capacity per unit area (mAh/cm}^2\text{)}} \quad \text{Equation (1)}$$

In Equation (1), negative electrode charge capacity per unit area=negative electrode loading level per unit area (g/cm$^2$)×negative electrode active material rate (%)×negative electrode charge capacity per unit weight (mAh/g), negative electrode efficiency=(negative electrode discharge capacity/negative electrode charge capacity)×100, positive electrode design capacity per unit area=design capacity/coated positive electrode area, and design capacity=positive electrode loading level (g/cm$^2$)×positive electrode active material rate (%)×positive electrode charge capacity per unit weight (mAh/g)−irreversible negative electrode capacity (mAh).

Meanwhile, positive electrode charge capacity per unit weight, negative electrode charge capacity per unit weight, negative electrode discharge capacity, and irreversible negative electrode capacity may be measured using the following methods.

1) A method of measuring a positive electrode charge capacity per unit weight: A half cell is prepared as a positive electrode to be evaluated, an opposite electrode is formed of lithium metal, the capacity of the half cell is measured when charging is performed at low rate control (after 0.2 C), and the measured capacity is normalized by weight of the half cell.

2) A method of measuring a negative electrode charge capacity per unit weight: A half cell is prepared as a negative electrode to be evaluated, an opposite electrode is formed of lithium metal, the capacity of the half cell is measured when charging is performed at low rate control (after 0.2 C), and the measured capacity is normalized by weight of the half cell.

3) A method of measuring a negative electrode discharge capacity per unit weight: A half cell is prepared as a negative electrode to be evaluated, an opposite electrode is formed of lithium metal, the capacity of the half cell is measured at the time of discharging after charging is performed at low rate control (after 0.2 C), and the measured capacity is normalized by weight of the half cell.

4) A method of measuring an irreversible negative electrode capacity per unit weight: The difference between capacities at the time of charging and discharging a negative electrode half cell once is measured.

5) Definition of a negative electrode loading level per unit area: Weight of a negative electrode active material coated on a negative electrode current collector per unit area.

6) Definition of a positive electrode loading level per unit area: Weight of a positive electrode active material coated on a positive electrode current collector per unit area.

In a concrete embodiment configured such that the N/P ratio at the interface between the electrode groups is higher than the N/P ratio of the positive electrode and the negative electrode constituting the electrode group having the relatively large area, a loading level of a positive electrode constituting an n-th electrode group and a loading level of a positive electrode constituting an (n+1)-th electrode group and may be equal, and a loading level of a negative electrode constituting the (n+1)-th electrode group may be higher than that of a negative electrode constituting the n-th electrode group.

In addition, the loading level of the negative electrode constituting the (n+1)-th electrode group and the loading level of the negative electrode constituting the n-th electrode group may be equal, and the loading level of the positive electrode constituting the n-th electrode group may be higher than that of the positive electrode constituting the (n+1)-th electrode group.

In this case, a ratio of the N/P ratio of the positive electrode and the negative electrode constituting the n-th electrode group to the N/P ratio of the positive electrode and the negative electrode constituting the (n+1)-th electrode group stacked on the n-th electrode group may be 1:1.

In addition, the N/P ratio of the positive electrode and the negative electrode constituting the (n+1)-th electrode group stacked on the n-th electrode group may be greater than N/P ratio of the positive electrode and the negative electrode constituting the n-th electrode group.

Here, the size or area of the electrodes constituting the n-th electrode group may be greater than that of the electrodes constituting the (n+1)-th electrode group.

In another concrete embodiment configured such that the N/P ratio at the interface between the electrode groups is higher than the N/P ratio of the positive electrode and the negative electrode constituting each of the electrode groups, a loading level of a positive electrode constituting an (n−1)-th electrode group, a loading level of a positive electrode constituting an n-th electrode group, and a loading level of a positive electrode constituting an (n+1)-th electrode group may be equal, and a loading level of a negative electrode constituting the (n−1)-th electrode group and a loading level of a negative electrode constituting the (n+1)-th electrode group may be higher than that of a negative electrode constituting the n-th electrode group.

In addition, the loading level of the negative electrode constituting the (n−1)-th electrode group, the loading level of the negative electrode constituting the n-th electrode group, and the loading level of the negative electrode constituting the (n+1)-th electrode group may be equal, and the loading level of the positive electrode constituting the n-th electrode group may be higher than that of the positive electrode constituting the (n−1)-th electrode group and that of the positive electrode constituting the (n+1)-th electrode group.

In this case, a ratio of the N/P ratio of the positive electrode and the negative electrode constituting the n-th electrode group to the N/P ratio of the positive electrode and the negative electrode constituting the (n+1)-th electrode group stacked on the n-th electrode group may be 1:1, and a ratio of the N/P ratio of the positive electrode and the negative electrode constituting the n-th electrode group to the N/P ratio of the positive electrode and the negative electrode constituting the (n−1)-th electrode group stacked on the n-th electrode group in the direction opposite to the height direction on the basis of the plane may be 1:1.

In addition, the N/P ratio of the positive electrode and the negative electrode constituting the (n+1)-th electrode group stacked on the n-th electrode group may be higher than the N/P ratio of the positive electrode and the negative electrode constituting the n-th electrode group, and the N/P ratio of the positive electrode and the negative electrode constituting the (n−1)-th electrode group stacked on the n-th electrode group in the direction opposite to the height direction on the basis of the plane may be higher than the N/P ratio of the positive electrode and the negative electrode constituting the n-th electrode group.

Here, the size or area of the electrodes constituting the nth electrode group may be greater than that of the electrodes constituting the (n−1)-th electrode group and that of the electrodes constituting the (n+1)-th electrode group.

As long as the N/P ratio at the interface between the electrode groups is equal to or higher than the N/P ratio of the positive electrode and the negative electrode constituting the electrode group having the relatively large area, an N/P ratio of a positive electrode and a negative electrode constituting an electrode group having a relatively small area may be equal to or greater than that of the positive electrode and the negative electrode constituting the electrode group having the relatively large area.

In addition, as long as the N/P ratio at the interface between the electrode groups is equal to or higher than the N/P ratio of the positive electrode and the negative electrode constituting the electrode group having the relatively large area, a loading level of the negative electrode constituting the electrode group having the relatively small area may be equal to or greater than that of the negative electrode constituting the electrode group having the relatively large area.

Furthermore, as long as the N/P ratio at the interface between the electrode groups is equal to or higher than the N/P ratio of the positive electrode and the negative electrode constituting the electrode group having the relatively large area, a loading level of the positive electrode constituting the electrode group having the relatively small area may be equal to or less than that of the positive electrode constituting the electrode group having the relatively large area.

Under the condition that the electrodes have the same porosity, the loading levels of the electrodes may be checked based on the thicknesses of the electrodes. The thicknesses of the electrodes may be checked using ion milling.

In the structure in which the unit cells are stacked or the structure in which the electrode groups are stacked, electrode tabs of the electrode plates having the same polarity may protrude from the respective electrode plates such that the electrode tabs are arranged at a position sharing the same imaginary vertical line.

That is, on the basis of the position at which the electrode tab of the electrode plate having the smallest size among the electrode plates having the same polarity is formed, the remaining electrode tabs may be formed at a position at which the electrode tab of the electrode plate having the smallest size and the remaining electrode tabs share an imaginary vertical line.

For example, the respective positive electrode tabs may be formed at a position at which the respective positive electrode tabs and the positive electrode tab of the positive electrode plate having the smallest size share an imaginary vertical line on the basis of the position at which the positive electrode tab of the positive electrode plate having the smallest size is formed.

In the above structure, the plane is an arbitrary plane. For example, the plane may be a ground or a plane perpendicular to the ground. Consequently, the electrode plates may be stacked on the plane in the height direction. Alternatively, the electrode plates may be stacked on the plane perpendicular to the ground in the height direction.

Hereinafter, the plane may refer to the ground for the convenience of understanding. In this case, the height direction from the plane may refer to the direction opposite to the direction of gravity, and the direction opposite to the height direction may refer to the direction of gravity.

For example, the expression "the electrode plates are stacked in the height direction on the basis of the plane" in the above description may mean that the electrode plates may be stacked from the ground in the direction of gravity and/or in the direction opposite to gravity. Consequently, the stacked direction of the electrode plates may be the direction of gravity and/or the direction opposite to gravity.

Specifically, the stair-like structure may be formed in a case in which two electrode groups having different sizes are stacked in a state in which a separation film is interposed between the respective electrode groups and one side surface, the other side surface, or one side surface and the other side surface of each of the electrode groups are surrounded by the separation film.

In addition, the stair-like structure may also be formed in a case in which three electrode groups having different sizes are stacked such that electrode plates having opposite polarities face each other in a state in which a separation film is interposed between the respective electrode groups and one side surface, the other side surface, or one side surface and the other side surface of each of the electrode groups are surrounded by the separation film.

A structure having three or more stairs will be easily understood by those skilled in the art from the above description, and a detailed description thereof will be omitted.

Meanwhile, the sub unit cells may be configured to have a structure in which two or more full-cells are bonded to each other by heat and pressure in a state in which a separator is disposed between the full-cells in order to secure desired rigidity.

In this case, each of the full-cells may be configured to have a structure in which a separator, a positive electrode, a separator, a negative electrode, and a separator are sequentially stacked, and a fixing member may be added to one side surface of each of the full-cells bonded to each other by heat and pressure in order to secure the safety of the stacked structure.

In addition, the unit cells may be stacked such that electrode terminals are arranged at the same position.

In accordance with another aspect of the present invention, there is provided a battery cell having the electrode assembly with the above-stated construction mounted in a battery case.

Specifically, electrode tabs of unit cells of the electrode assembly may be coupled to a single electrode lead to form an electrode terminal of the battery cell.

For example, the battery cell may be a pouch-shaped battery cell having an electrode assembly mounted in a pouch-shaped case. However, the present invention is not limited thereto.

Specifically, the pouch-shaped battery cell may be configured to have a structure in which an electrode assembly is mounted in a battery case, made of a laminate sheet including a resin layer and a metal layer, in a state in which the electrode assembly is connected to electrode terminals protruding outward from the battery case.

The battery case is manufactured so as to have a sufficient thickness to exhibit predetermined flexibility such that a stair-like step is formed at the battery case. If the thickness of the battery case is too large, the battery case may be broken due to the lack of flexibility when the step is formed at the battery case. In addition, the volume and weight of the battery cell are increased. On the other hand, if the thickness of the battery case is too small, the battery case may be easily broken by external force. For this reason, the battery case may be manufactured so as to have a thickness of 50 to 200 μm, at which the battery case has appropriate flexibility and durability.

The battery case may include an upper case and a lower case. The upper case and the lower case may be separate members. Alternatively, the upper case and the lower case may be connected to each other at corresponding ends thereof to constitute a single member.

The stair-like step may be formed at the receiving part of the battery case using various methods. For example, a battery case may be inserted into a die having a stair-like step formed at the inside thereof, and pressure may be applied to the die such that the stair-like step is formed at the receiving part of the battery case.

In another example, an electrode assembly including stacked electrodes or unit cells having different sizes is inserted into the receiving part of the battery case, and vacuum is applied into the receiving part of the battery case such that the receiving part of the battery case shrinks, whereby the stair-like step is formed at the receiving part of the battery case.

That is, the electrode assembly is configured to have a structure in which a plurality of electrodes or unit cells having different planar sizes. When the electrode assembly is mounted in the receiving part of the battery case and vacuum is applied into the receiving part of the battery case, the battery case shrinks in response to the external shape of the electrode assembly, with the result that the battery case is deformed, whereby the stair-like step is formed at the receiving part of the battery case.

The vacuum application method solves a problem in that a new battery case must be manufactured whenever the design of the electrode assembly is changed and prevents a phenomenon in which stress is locally concentrated.

The receiving part of the battery case is formed so as to have a sufficient size to allow the electrode assembly to be located in the receiving part of the battery case. In a preferred example, a portion of the receiving part of the battery case at which the stair-like step is formed may be configured to have a curved structure corresponding to the shape of the step on vertical section. When vacuum is applied, therefore, the curved region of the receiving part comes into tight contact with the electrode assembly in order to remove a surplus space between the curved region of the receiving part and the electrode assembly, with the result that the shrinkage may be minimized.

In a concrete example, the receiving part of the battery case may be configured to have a hemispherical shape including a planar region corresponding to the upper end of the electrode assembly. In this case, the hemispherical region of the receiving part is deformed, with the result that the stair-like step is formed at the receiving part.

The battery cell is a lithium ion battery or a lithium ion polymer battery. However, the present invention is not limited thereto.

In general, a lithium ion battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode is prepared by applying and drying a negative electrode active material to a negative electrode current collector. The above-mentioned components may be selectively included in the negative electrode as needed.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as the separator.

The non-aqueous electrolytic solution containing lithium salt is composed of a polar organic electrolytic solution and lithium salt. A non-aqueous liquid electrolytic solution, an organic solid electrolyte, or an inorganic solid electrolyte may be used as the electrolytic solution.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolytic solution, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas.

In accordance with another aspect of the present invention, there is provided a device including the battery cell with the above-stated construction as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

In accordance with a further aspect of the present invention, there is provided a battery pack including two or more battery cells with the above-stated construction as unit batteries. That is, the battery pack is configured to have a structure in which two or more battery cells as unit batteries are connected to each other in series and/or in parallel. The battery pack may be used in a device, such as a mobile phone, a portable computer, a smart phone, a tablet PC, a smart pad, a netbook computer, a light electronic vehicle (LEV), an electric vehicle, a hybrid electric vehicle, a plug-in hybrid electric vehicle, or a power storage apparatus.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
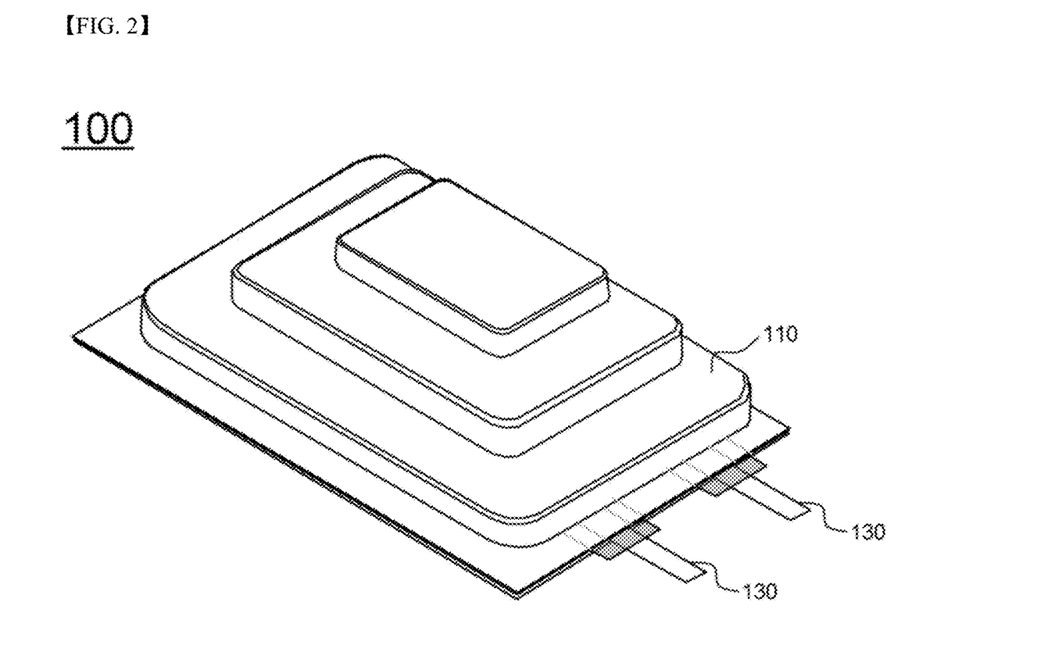
FIG. 2 is a perspective view showing a battery cell according to an embodiment of the present invention.
Figure 3:
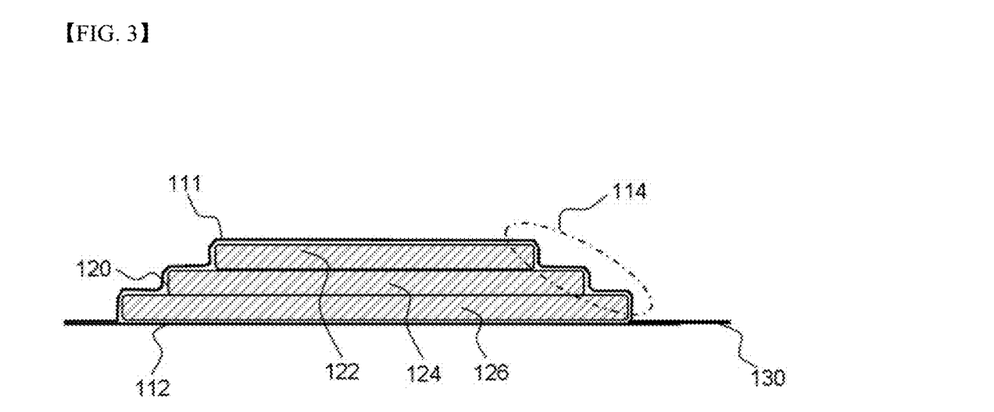
FIG. 3 is a vertical sectional view of FIG. 2.

FIG. 2 is a perspective view showing a battery cell according to an embodiment of the present invention, and FIG. 3 is a vertical sectional view of FIG. 2.

Referring to FIGS. 2 and 3, a battery cell 100 is configured to have a structure in which an electrode assembly 120 is mounted in a pouch-shaped battery case 110 made of a laminate sheet. Electrode leads 130, which are electrically connected to the electrode assembly 120, protrude outward from the battery case 110. The battery case 110 includes an upper case 111 and a lower case 112. The upper case 111 is provided with a receiving part 116, in which the electrode assembly 120 is mounted.

The electrode assembly 120 includes a plurality of unit cells 122, 124, and 126 having different sizes. The unit cells 122, 124, and 126 are stacked in a height direction on the basis of a plane. The receiving part 116 of the battery case 110 is configured to have a stair-like step 114 corresponding to the external shape of a structure in which the unit cells 122, 124, and 126 are stacked.

The battery cell 100 having the above-stated structure may be manufactured so as to have various capacities and sizes. As a result, the battery cell 100 may be easily mounted in a space in which it is difficult to mount a conventional battery cell. In addition, a battery cell having in increased capacity may be mounted in a limited space of a device depending upon the internal structure of the device. Consequently, it is possible to maximally utilize the internal space of the device.

Figure 4:
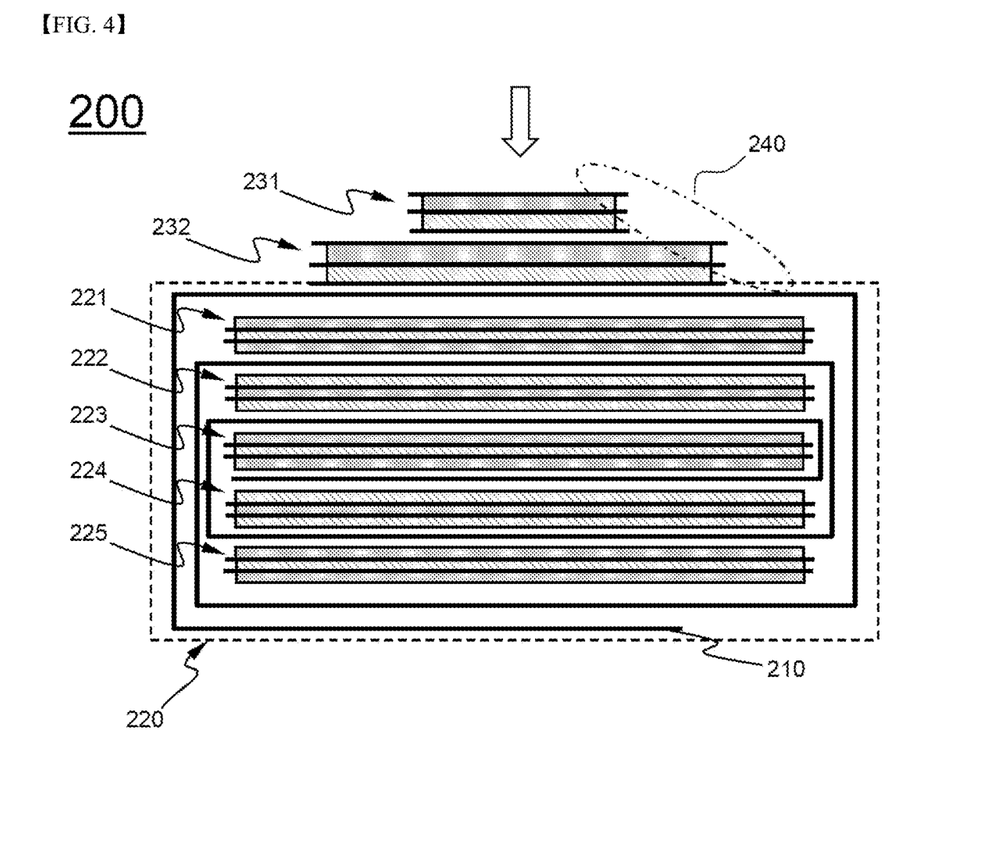
FIG. 4 is a perspective view showing an electrode assembly according to an embodiment of the present invention.

FIG. 4 is a perspective view typically showing an electrode assembly according to an embodiment of the present invention.

Referring to FIG. 4, an electrode assembly 200 according to the present invention is configured to have a structure in which five base unit cells 221, 222, 223, 224, and 225 having the same size are wound using a single sheet-type separation film 210 to constitute an integrated base structure 220, and sub unit cells 231 and 232 are stacked on the integrated base structure 220 in a height direction on the basis of a plane of the base unit cells 221, 222, 223, 224, and 225.

Each of the base unit cells 221, 222, 223, 224, and 225 is a bi-cell, which is configured to have a structure in which positive electrodes and negative electrodes are stacked in a state in which separators are disposed respectively between the positive electrodes and negative electrodes and in which the electrodes are located at the opposite major surfaces of the base unit cell have the same polarity. Specifically, the middle base unit cell 223 and the outermost base unit cells 221 and 225 are C-type bi-cells, each of which is configured to have a structure in which negative electrodes are located at the opposite major surfaces of the base unit cell. The base unit cells 222 and 224 located between outermost base unit cells 221 and 225 and the middle base unit cell 223 are A-type bi-cells, each of which is configured to have a structure in which positive electrodes are located at the opposite major surfaces of the base unit cell.

Each of the sub unit cells 231 and 232 is a full-cell, in which the electrode plates located at opposite major surfaces of the sub unit cell have different polarities. The sub unit cells 231 and 232 have the same thickness but different sizes. The sub unit cells 231 and 232 are sequentially stacked upward from the lower end of the electrode assembly 200 such that the sub unit cell having the smaller size is located on the sub unit cell having the larger size. That is, the unit cells are sequentially stacked upward in a direction indicated by an arrow.

In addition, the sub unit cells 231 and 232 have smaller sizes than the base unit cells 221, 222, 223, 224, and 225. The base unit cell 221 and the sub unit cell 232, which face each other, are configured such that an electrode plate of the base unit cell 221 is a negative electrode and an electrode plate of the sub unit cell 232 facing the electrode plate of the base unit cell 221 is a positive electrode.

Consequently, the electrode assembly 200 is configured to have a hybrid structure in which the full-cell type sub unit cells 231 and 232 are stacked on the upper end of the integrated base structure 220, which is formed by winding the bi-cell type main unit cells using the sheet-type separation film 210, in the direction indicated by the arrow. As a result, it is possible to increase a degree of freedom in thickness of the sub unit cells 231 and 232, which form the step 240, as compared with an electrode assembly including only bi-cells. In addition, it is possible to secure desired rigidity of the battery cell by the provision of the integrated base structure 220, as compared with an electrode assembly including only full-cells.

Figure 5:
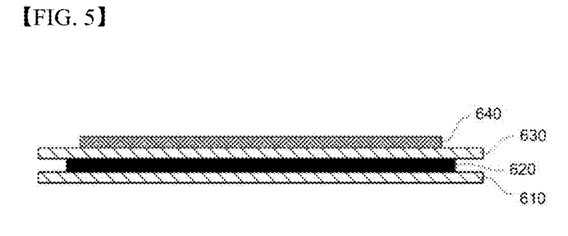
FIG. 5 is a sectional view typically showing the structure of an electrode plate stack according to an embodiment of the present invention.
Figure 6:
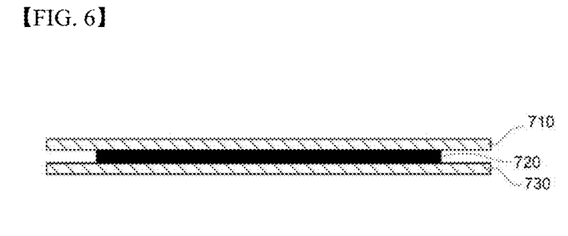
FIG. 6 is a sectional view typically showing the structure of an electrode plate stack according to another embodiment of the present invention.

FIG. 5 is a sectional view typically showing the structure of an electrode plate stack according to an embodiment of the present invention, and FIG. 6 is a sectional view typically showing the structure of an electrode plate stack according to another embodiment of the present invention.

An electrode plate stack shown in FIG. 5 is configured to have a structure in which a separation plate 610, a negative electrode plate 620, a separation plate 630, and a positive electrode plate 640 are joined to each other while being sequentially stacked.

Another electrode plate stack shown in FIG. 6 is configured to have a structure in which a separation plate 710, a negative electrode plate 720, and a separation plate 730 are joined to each other while being sequentially stacked.

Figure 7:
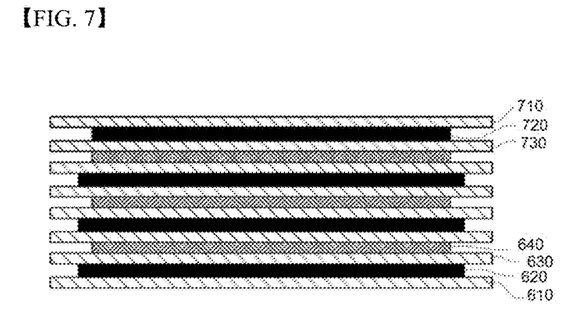
FIG. 7 is a sectional view typically showing the structure of a unit cell according to another embodiment of the present invention.

FIG. 7 is a sectional view typically showing the structure of a unit cell according to another embodiment of the present invention. Specifically, the unit cell is configured to have a structure in which an electrode plate stack having a structure shown in FIG. 6 is stacked on the upper end of an electrode plate stack group including a plurality of electrode plate stacks each having a structure shown in FIG. 5.

Figure 8:
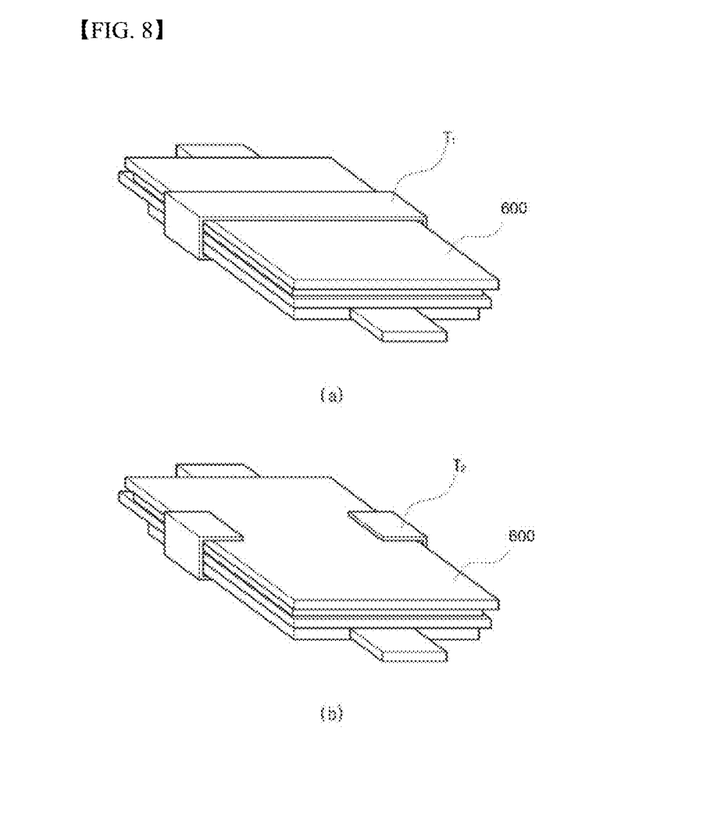
FIG. 8 is a typical view showing a fixing member added to the electrode plate stack of FIG. 5.

FIG. 8 is a typical view showing a fixing member added to the electrode plate stack of FIG. 5. Specifically, a fixing member T1 is added to the front surface or the side surfaces of the electrode plate stack 600.

In order to secure safety of the simply stacked structure, an additional stripe fixing member may be added to the sides of the stacked structure in order to fix the stacked structure. As shown in FIG. 8(a), a taping type fixing member may be attached to the front surface of the electrode plate stack 600. Alternatively, only the side surfaces of the electrode plate stack 600 may be fixed using fixing members T2, as shown in FIG. 8(b).

In the electrode plate stacks shown in FIGS. 5 to 8, positive electrodes or negative electrodes having the same thickness are joined to each other while being stacked to form bi-cells. Alternatively, positive electrodes or negative electrodes having different sizes may be used so as to form full-cells or bi-cells based on the shape or size of a battery cell, to which the positive electrodes and the negative electrodes are applied.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode assembly according to the present invention is configured as a hybrid type electrode assembly having a stair-like step. Consequently, it is possible to easily secure an installation space of a battery cell, to maximally utilize the internal space of a device. In addition, it is possible to use a high-capacity battery cell in a device and to further reduce the size of the device.

Furthermore, it is possible to easily manufacture a battery cell having a desired shape even in a case in which it is necessary to change a design due to the structural features of an electrode assembly and a battery case.

The invention claimed is:

1. An electrode assembly comprising a plurality of unit cells, each of which comprises an electrode plate stack configured to have a structure in which one or more separators are disposed between electrode plates comprising positive electrodes or negative electrodes, wherein
   the electrode assembly comprises a combination of two or more kinds of unit cells having different sizes,
   the unit cells are stacked in a height direction on a basis of a plane,
   two or more of the plurality of unit cells are base unit cells located at a lower part of the electrode assembly and are wound using a single sheet-type separation film to constitute an integrated base structure, the single sheet-type separation film being provided in addition to the one or more separators of the two or more of the unit cells, the separation film having a first winding end located within the integrated base structure and a second winding end located at an outermost surface of the integrated base structure,
   the others of the plurality of unit cells excluding the base unit cells are sub unit cells and are stacked in a state in which an additional separator is disposed between the respective sub unit cells, the sub unit cells being stacked on the separation film so as to be located outside the integrated base structure,
   all of the separators are planar,
   the base unit cells are bi-cells, and
   the sub unit cells are full-cells.

2. The electrode assembly according to claim 1, wherein the two or more kinds of unit cells are different from each other in terms of at least one selected from among a thickness, a breadth (horizontal length), and a width (vertical length) of each of the unit cells.

3. The electrode assembly according to claim 1, wherein each bi-cell of the base unit cells is configured to have a structure in which the one or more positive electrodes and the one or more negative electrodes are stacked in a state in which the separator is disposed respectively between the positive electrodes and negative electrodes and in which the electrodes are located at opposite major surfaces of the base unit cell have the same polarity.

4. The electrode assembly according to claim 3, wherein two outermost bi-cells of the integrated base structure are C-type bi-cells, each of which is configured to have a structure in which negative electrodes are located at the opposite major surfaces of the base unit cell.

5. The electrode assembly according to claim 3, wherein the bi-cells have the same size.

6. The electrode assembly according to claim 1, wherein each full-cell of the sub unit cells is configured to have a structure in which the electrode plates located at opposite major surface of the sub unit cell have different polarities.

7. The electrode assembly according to claim 6, wherein the sub unit cells are sequentially stacked upward from a lower end of the electrode assembly such that a sub unit cell having a smaller size is located on a sub unit cell having a larger size.

8. The electrode assembly according to claim 6, wherein the full-cells are configured such that the electrode plates having relatively large sizes while being adjacent to each other in a state in which the separator is disposed between the electrode plates are negative electrodes.

9. The electrode assembly according to claim 6, wherein the sub unit cells have the same thickness.

10. The electrode assembly according to claim 1, wherein the base unit cells have a larger thickness, breadth, and width than the sub unit cells.

11. The electrode assembly according to claim 10, wherein one of the base unit cells and a corresponding one of the full-cells adjacent to the base unit cell are configured such that the electrode plate of the base unit cell is a negative electrode and the electrode plate of the full-cell is a positive electrode.

12. The electrode assembly according to claim 1, wherein the sub unit cells are configured to have a structure in which two or more of the full-cells are bonded to each other by heat and pressure in a state in which the additional separator is disposed between the full-cells.

13. The electrode assembly according to claim 12, wherein each of the full-cells is configured to have a structure in which the separator, the positive electrode, the separator, the negative electrode, and the separator are sequentially stacked.

14. The electrode assembly according to claim 12, wherein a fixing member is added to one side surface of each of the full-cells bonded to each other by heat and pressure.

15. The electrode assembly according to claim 1, wherein the unit cells are stacked such that electrode terminals are arranged at the same position.

16. The electrode assembly according to claim 1, wherein the unit cells are separated from each other.

17. A battery cell having an electrode assembly according to claim 1 mounted in a battery case.

18. The battery cell according to claim 17, wherein electrode tabs of unit cells of the electrode assembly are coupled to a single electrode lead to form an electrode terminal of the battery cell.

19. The battery cell according to claim 18, wherein the battery cell is a pouch-shaped battery cell having an electrode assembly mounted in a pouch-shaped case.

20. The battery cell according to claim 17, wherein the battery case is formed to have a shape corresponding to the electrode assembly.

21. The battery cell according to claim 17, wherein the battery cell is a lithium ion secondary battery or a lithium ion polymer secondary battery.

22. A battery pack comprising two or more battery cells according to claim 17.

23. A device comprising two or more battery packs according to claim 22.

24. A device comprising two or more battery cells according to claim 17.

25. The device according to claim 22, wherein the device is selected from among a mobile phone, a portable computer, a smart phone, a smart pad, a netbook computer, a light electronic vehicle (LEV), an electric vehicle, a hybrid electric vehicle, a plug-in hybrid electric vehicle, and a power storage apparatus.

* * * * *